Figure 1:
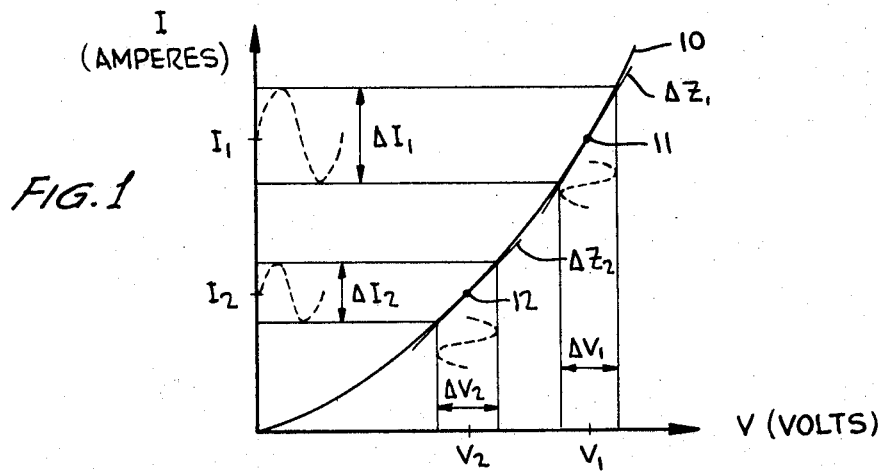

June 4, 1968    W. S. KAUFMANN ET AL    3,387,211
CIRCUIT FOR MEASURING THE DYNAMIC IMPEDANCE
RATIO OF A NONLINEAR DEVICE
Filed April 8, 1966

INVENTORS,
W. S. KAUFMANN
R. C. MILLER
BY *JM Presson*
ATTORNEY

United States Patent Office 3,387,211
Patented June 4, 1968

1

3,387,211
CIRCUIT FOR MEASURING THE DYNAMIC
IMPEDANCE RATIO OF A NONLINEAR
DEVICE
William S. Kaufmann, Reading, and Richard C. Miller, Sinking Spring, Pa., assignors to Western Electric Company, Incorporated, New York, N.Y., a corporation of New York
Filed Apr. 8, 1966, Ser. No. 541,348
11 Claims. (Cl. 324—158)

This invention relates generally to a circuit for measuring the amount by which a voltage-current characteristic of a nonlinear device deviates from an ideal voltage-current characteristic. More specifically, this invention relates to a circuit for determining the dynamic impedance ratio of a nonlinear device characterized as having an exponential voltage-current characteristic.

Several types of commercially available two terminal electronic components exhibit exponential voltage-current characteristics throughout at least a portion of their operating ranges. Examples of devices that have exponential voltage-current characteristics and which may be operated in these nonlinear ranges include various types of diodes, saturable-core inductors, thyrites and varactors. The operating points of these devices are established by D.C. bias voltages or currents. However, before the response of a particular nonlinear device to a small signal input may be predicted, a determination should be made as to the extent that the voltage-current characteristic of the particular device deviates from the exponential voltage-current characteristic of an ideal device.

A typical exponential characteristic curve is plotted from measured values of current through the device and voltage across the device. The slope of a straight line from the origin to a particular point on the characteristic curve represents the static or D.C. impedance of the device for those values of current and voltage. For time-varying or A.C. currents and voltages, the dynamic or A.C. impedance of nonlinear devices varies from point to point along the plotted characteristic curve. For devices having voltage current characteristics that are essentially ideal, that is, essentially exponential, the first derivative of the equation defining the voltage-current characteristic can be represented by a linear equation. For such ideal devices, the dynamic impedance of the device to small signals applied to an operating point on the characteristic curves can be closely approximated by a straight line drawn tangent to the characteristic curve at that operating point. The slope of this line for an incremental length determined by the peak-to-peak amplitude swing of the small signal about the operating point is equal to the dynamic impedance of such a device at that operating point.

Since the slopes of lines drawn tangent to a nonlinear characteristic curve vary from point to point along the curve, the values of dynamic impedance correspondingly vary from point to point along the characteristic curve. In order to establish whether or not a device has an acceptable voltage-current characteristic over a particular operating range, the dynamic impedance at one point is compared to the dynamic impedance at a second point. The two points are usually selected near the limits of the operating range since it is the voltage-current characteristic in this region which is usually of interest. If the value of the ratio of the two dynamic impedances falls within acceptable limits, then the voltage-current characteristic of the device is considered to be acceptable for the purpose desired.

The computation of the dynamic impedance ratio is currently performed by a computer which is suitably programmed to compute the impedance ratio at two or more points along the characteristic curve of the device under test from voltage and current measurements taken from the device at such points. These measurements are converted into a form that the computer can operate upon to compute the dynamic impedance ratio. The computer can also compare the computed ratio to an ideal ratio to establish whether or not the device under test is acceptable.

Although computers are capable of determining the dynamic impedance ratio of nonlinear devices based upon data obtained from the devices, considerable peripheral apparatus is also required. Such apparatus includes facilities for measuring A.C. current and voltage amplitudes at two or more points in the operating range of the device, facilities for translating these measured values into digital form suitable for use by the computer, facilities for reading this data into the computer, and print-out facilities.

In addition to the obvious cost and complexity involved in utilizing computers to measure this parameter of a nonlinear device, significant errors may be introduced into the measurement of the A.C. current and voltage amplitudes, and in the conversion of these measured values to digital form. Further, the manual measurement of these amplitudes is a tedious and time-consuming proposition, particularly when a large number of devices are involved. Still further, it is necessary to suitably identify the data to correspond with the devices from which the data is obtained and to retain the identification of the measured data throughout all stages of computation.

Broadly, therefore, it is an object of this invention to provide a circcuit that determines the amount of deviation between a voltage-current characteristic of a device of the type described hereinabove and an ideal current-voltage characteristic.

More specifically, it is an object of this invention to provide a circuit that compares the forward voltage-current characteristic of a semiconductor diode that is connected into the circuit to that of an ideal forward voltage-current characteristic.

Still further, it is an object of this invention to provide a circuit for determining the forward dynamic impedance ratio of a device having an exponential forward voltage-current characteristic.

In accordance with one embodiment of this invention, a circuit is provided which includes a pair of terminals for making an electrical connection with a nonlinear device includable within that family of devices described above and that may be inserted into the circuit. A constant current source applies a first time-varying or A.C. current that is superimposed upon a first D.C. current to the terminal pair and the device. The first A.C. current produces a first time-varying or A.C. voltage across the device which is converted to a proportional first D.C. voltage. This first D.C. voltage is then compared to a reference voltage that corresponds to the amplitude of an A.C. voltage across the device that is desired. If the levels of the first D.C. voltage and the reference voltage are different, a difference voltage is produced and stored by a voltage memory device. The memory device is incorporated in a feedback loop which is initially closed to permit the difference voltage to adjust the amplitude of the first A.C. current from the current source in accordance with the difference signal until the level of the first D.C. voltage is substantially equal to that of the reference voltage. When the circuit stabilizes, the dynamic impedance at one point in the operating range of the device is established by the memory device. The feedback loop is thereupon opened and the current supply is then programmed to provide a second time-varying or A.C. current that is superimposed upon a second D.C. current. The memory device maintains the amplitude ratio of the second A.C. to the second D.C. current at the same amplitude ratio that the first A.C. to the first D.C. current had immediately prior to the opening of the feedback loop. The second A.C. current through the device is converted to a proportional second D.C. voltage which is compared to that of the reference voltage to determine the amount of deviation of the voltage-current characteristic curve of the device under test from an ideal characteristic. In accordance with another embodiment of this invention, the circuit is designed to readout directly the dynamic impedance ratio of the device under test.

For reasons that will become evident subsequently, the terms "exponential" or "exponentially varying" as used herein include exponential functions of voltage or current wherein the exponent is raised to negative as well as positive values.

Figure 3:
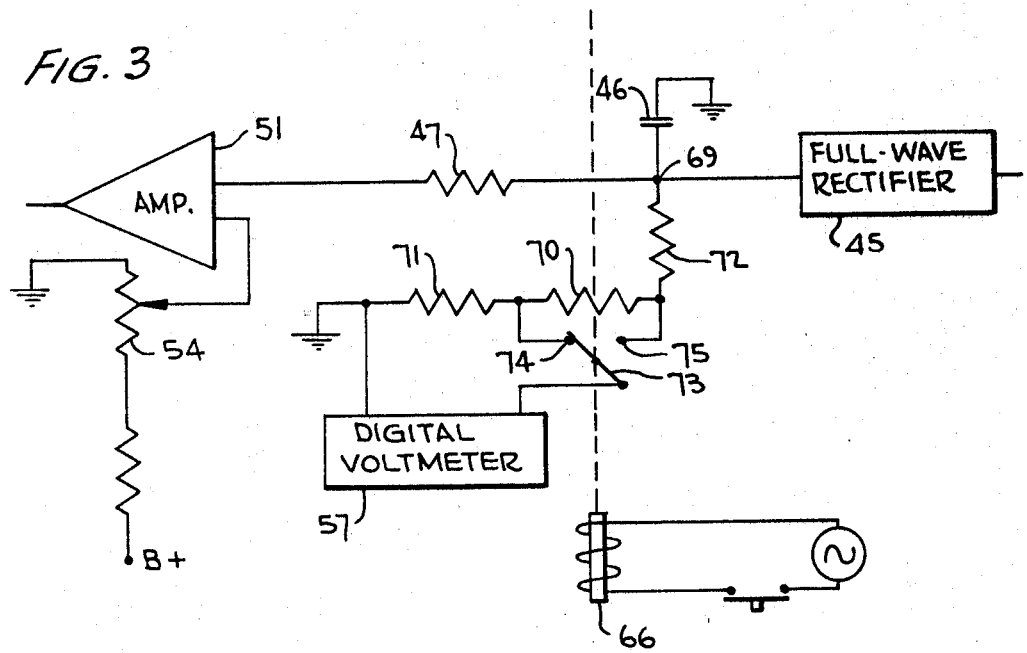
Figure 2:
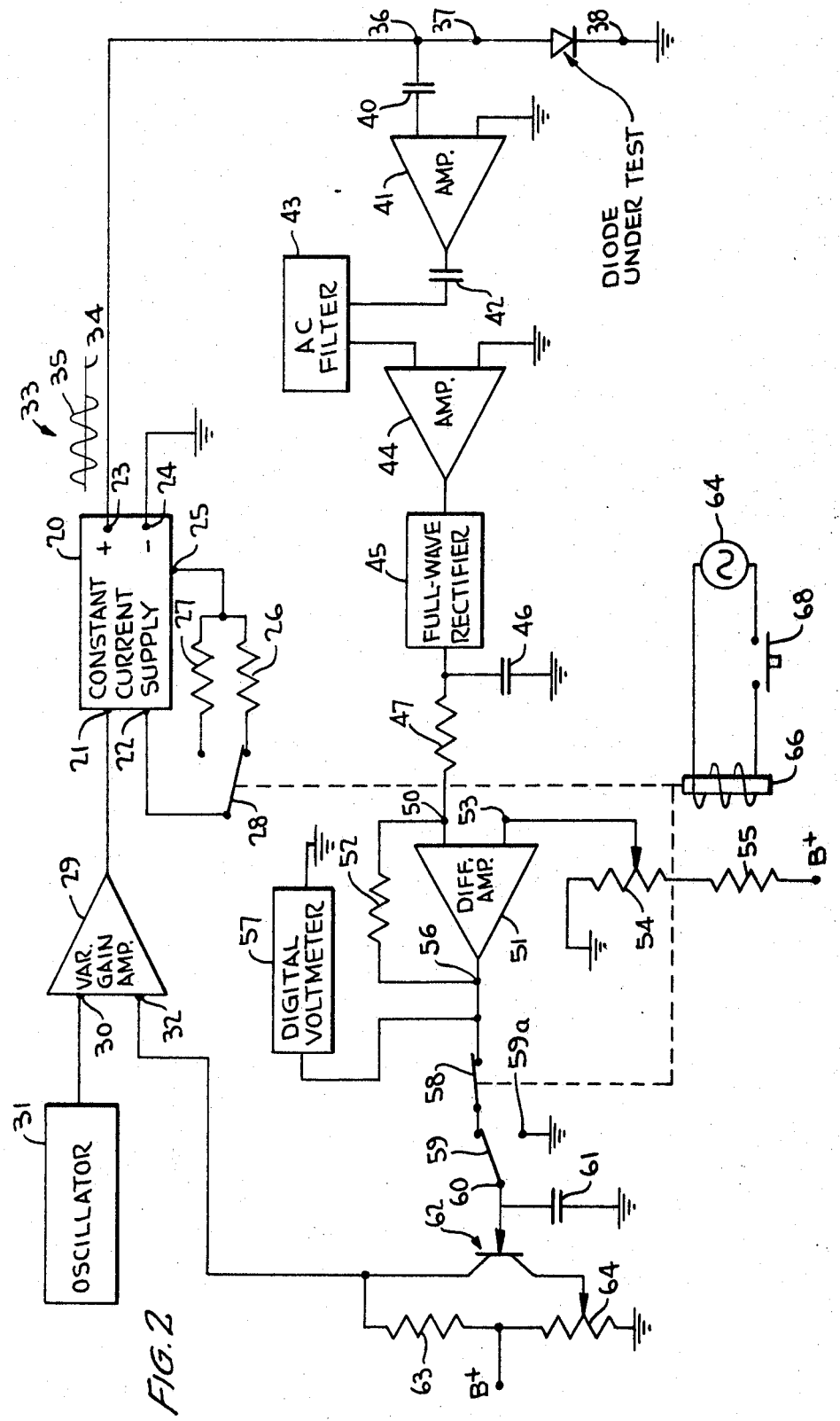

A complete understanding of this invention may be had by reference to the following detailed description when read in conjunction with the accompanying drawings illustrating a preferred embodiment thereof, wherein:

FIG. 1 illustrates a typical exponential voltage-current characteristic curve of a semiconductor diode in the forward current and voltage regions and in addition, illustrates the forward dynamic impedance at two selected points on this curve; and FIG. 2 is a combined block-schematic circuit diagram illustrating a preferred embodiment of the present invention for measuring the amount by which the exponential voltage-current characteristic of a device under test deviates from an ideal exponential voltage-current characteristic;

FIG. 3 is a block-schematic circuit diagram illustrating a preferred embodiment of the present invention for measuring the dynamic impedance ratio of a nonlinear device having an exponential voltage-current characteristic.

Referring to FIG. 1, the characteristic curve 10 represents an ideal characteristic curve of a family of devices having an exponential voltage-current relationship. More particularly, the curve 10 is a typical plot of total current, I, through a semiconductor diode against total voltage, V, across the diode when the diode is operated in its forward current and voltage regions. The point 11 on the characteristic curve 10 is defined by one set of values of D.C. current and voltage, $I_1$ and $V_1$, respectively. Similarly, a point 12 on the characteristic curve is defined by a second set of values of D.C. current and voltage, $I_2$ and $V_2$, respectively, the second set of values being of a lower magnitude than the first set of values. Assuming that the desired operating range of the diode is along the portion of the characteristic curve that is substantially between the points 11 and 12, to determine whether or not a particular diode will provide the desired response to a small signal input, the dynamic impedance ratio between the points 11 and 12 may be ascertained by considering the dynamic impedance at each of these points.

As discussed hereinabove, the present invention is contemplated as including within the scope thereof those devices wherein the first derivative of the voltage-current characteristic equation can be represented as a straight line. The determination of whether or not a particular nonlinear device may be considered as classifiable within this family of devices involves considerations of the device parameters as well as assumptions that may be made in order to arrive at the differential equation which sets forth a linear relationship between the voltage and current variables comprising the equation.

In order to appreciate the nature of these considerations, the following analysis may be made of the well-known diode equation.

(1) $$I = I_s \left[ \exp\left(\frac{qV}{kT}\right) - 1 \right]$$

where $I$ = the total current through the diode; $I_s$ = the saturation current of the diode; $e = 2.7183 \ldots$; $k$ = Boltzmann constant, $1.38 \times 10^{-16}$ ergs/° K.; $T$ = absolute temperature in degrees Kelvin; $q$ = electronic charge for each carrier in the diode and is positive for holes and negative for electrons. Differentiating Equation 1 yields:

(2) $$dI = I_s \left(\frac{q}{kT}\right) \exp\left(\frac{qV}{kT}\right) dV$$

and rearranging terms, (3) $$\frac{dI}{dV} = \left(\frac{q}{kT}\right) I_s \exp\left(\frac{qV}{kT}\right)$$

For positive values of voltage V that are assumed to be several times larger than $kT/q$ (for example, 25 mv. at room temperature), Equation 3 reduces to:

(4) $$I = I_s \exp\left(\frac{qV}{kT}\right)$$

For negative values of voltage V that are assumed to be several times larger than $kT/q$, Equation 3 reduces to (5) $$I = -I_s \exp\left(\frac{qV}{kT}\right)$$

Thus, for positive voltages V, (6) $$\frac{dI}{dV} = \left(\frac{q}{kT}\right) I$$

and for negative voltages V, (7) $$\frac{dI}{dV} = \left(\frac{-q}{kT}\right) I$$

For semiconductor diodes, the dynamic impedance can be expressed in terms of the parameters $k$, $T$, $q$ and $I$ as (8) $$dZ = \frac{kT}{qI}$$

Therefore, for positive values of voltage V, the relationship between voltage V across the diode and the forward current I through the diode from equations 6 and 8 is (9) $$\frac{dI}{dV} = \frac{1}{dZ}$$

or

(10) $$dZ = \frac{dV}{dI}$$

For negative values of voltage V, Equation 10 becomes

(11) $$dZ = \frac{-dV}{dI}$$

Within the limitations set forth hereinabove in obtaining Equation 4, the linear equation $$dZ = \frac{dV}{dI}$$

describes the dynamic impedance of the diode at any point on the ideal forward voltage current characteristic curve. As will be apparent to those working in the semiconductor art, the error introduced by disregarding these limitations may be disregarded for most applications. The parameter $dZ$ is graphically representable by a straight line that is tangent to the characteristic curve at one point with a slope equal to the value of $dV/dI$ at that point.

Referring to FIG. 1, the forward dynamic impedance at two selected points, 11 and 12, on the ideal characteristic curve 10 is depicted by two straight lines designated $\Delta Z_1$ and $\Delta Z_2$, respectively. These lines are tangent to the points 11 and 12, respectively, and have slopes aqual to $\Delta V_1/\Delta I_1$ and $\Delta V_2/\Delta I_2$, respectively. The forward dynamic impedance ratio of the device between the points 11 and 12 is the ratio $\Delta Z_1:\Delta Z_2$.

Referring now to FIG. 1, there is shown a circuit that is constructed in accordance with the principles of the present invention for measuring the amount by which the voltage-current characteristic of a device under test deviates from an ideal voltage-current characteristic. The circuit includes a constant current supply 20 having a modulating or A.C. input terminal 21 and programmable input terminals 22 and 25. In addition, the current supply 20 includes a positive output terminal 23 and a grounded negative output terminal 24. Resistors 26 and 27 of predetermined values are selectively connectable between the programmable terminals 22 and 25 thereby selectively including these resistors in a negative feedback loop that is internal to the current supply 20. The selective connection of the resistors 26 and 27 into this feedback loop is effected by a switch 28 having one end thereof pivotally connected to the programmable input terminal 22. The current supply 20 is a conventional constant current supply, and may be, for example, a Model 612A current supply manufactured by Electronic Measurements Inc. of Eatontown, N.J.

The A.C. input terminal 21 of the current supply 20 is connected to a variable gain amplifier 29, having an A.C. input terminal 30 connected to an oscillator 31. A D.C. control terminal 32 of the variable gain amplifier 29 is connected to a feedback loop in the circuit which applies a variable level D.C. current to the terminal 32 for varying the gain of the amplifier 29. The oscillator 31 produces sinusoidal signals of constant amplitude and frequency and applies these signals to the A.C. input terminal 30 of the variable gain amplified 29. Sinusoidal signals of typically 1 kHz. frequency are supplied by the oscillator 31 to the A.C. input terminal 30. The output of the amplifier 29 will also be a sinusoidal signal having a frequency of 1 kHz. and an amplitude which increases and decreases as the level of the D.C. current applied to the D.C. control terminal 32 respectively increases and decreases. The A.C. output of the amplifier 29 is applied to the programmable input terminal 21 of the constant current supply 20. The current supply 20 produces an output signal 33 at the terminal 23 which is composed of two current components, a D.C. component 34 and an A.C. component 35 that is sinusoidally superimposed on the D.C. component 34.

The resistors 26 and 27 have values such that the current supply 20 produces two D.C. currents that correspond to the two points 11 and 12, FIG. 1, on the curve 10. Assume, for instance, that the points 11 and 12 represent nominal values of dynamic impedance of 960 ohms at 50 microamperes of D.C. bias current and 4.8K ohms at 10 microamperes of D.C. bias current, respectively. The resistor 26 is selected to have a resistance such that the supply 20 is programmed to produce 50 microamperes of D.C. bias current, and the resistor 27 is selected to program the supply 20 to produce 10 microamperes of D.C. bias current. More specifically, the supply 20, may, for example, be programmed to produce a constant D.C. component 34 of 50 microamperes at the output terminal 23 when a resistor 26 of 100K ohms is connected into the negative feedback loop of the supply. With the resistor 27 of, for example, 500K ohms connected in the negative feedback loop of this current supply, the D.C. component 34 of the current signal 33 will drop to one-fifth of its initial level as established by the 100K ohm resistor 26 or the 10 microamperes. It may be noted that the factor of one-fifth by which the D.C. component drops when the resistor 27 is connected into the negative feedback loop of the supply 20, is directly proportional to the one-to-five resistance ratio of the resistor 26 to the resistor 27.

Further assuming that the initial peak-to-peak amplitude of the 1 kHz. voltage signal applied to the terminal 21 is substantially 0.2 volt, with a 100K ohm resistor 26 connected into the negative feedback loop of the constant current supply 20, the current supply 20 will generate a sinusoidal superimposed A.C. component 35 on the 50 microampere D.C. component 34 having a peak-to-peak amplitude of 20 microamperes. When the resistor 27 is connected into the negative feedback loop of the current supply 20, and providing that the gain of the amplifier 29 remains fixed by a D.C. control current that is applied to the terminal 32 of the amplifier 29, the peak-to-peak amplitude of the A.C. component 35 will also drop to one-fifth of its immediately previous amplitude. However, it should be noted that the initial 20 microampere amplitude of the A.C. component 35 may be increased or decreased from this value as a result of a feedback control current respectively increasing and decreasing the gain of the amplifier 29.

With the resistor 26 connected in the negative feedback loop of the current supply 20, the D.C. current component 34 and the superimposed A.C. current component 35 from the supply 20 flows through a terminal 36 and through a pair of terminals 37 and 38 and a diode under test. The terminals 37 and 38 are designed to receive and make electrical connection with the untested diode. This diode may be manually inserted into the circuit of the present invention in the position illustrated or the diode may be automatically inserted into the present circuit by a suitable diode handling mechanism. The D.C. current component 34 of the signal 33 produces a D.C. voltage drop across the diode under test and the superimposed A.C. current component produces an A.C. voltage across the diode under test.

The A.C. voltage on the terminal 36 passes through a D.C. blocking capacitor 40 and is applied to the input terminal of a high input impedance emitter-follower amplifier 41. The D.C. component across the diode under test is blocked from the amplifier 41 by the capacitor 40. The amplifier 41 is incorporated in the circuit to prevent undesired loading of the signal output of the supply 20. The voltage output of the amplifier 41 is applied to a D.C. blocking capacitor 42 that blocks the D.C. component from the received signal and passes the A.C. component to a 1 kHz. filter 43. The 1 kHz. component of the signal passes through the filter 43 which attenuates spurious signals of other frequencies. The 1 kHz. output of the A.C. filter 43 is received and amplified by an amplifier 44, which may comprise a conventional A.C. amplifier. The amplified output of the amplifier 44 is full-wave rectified by a full-wave rectifier 45 which may comprise a conventional diode rectifier bridge. The rectified voltage is received and stored as a D.C. voltage by a 1 microfarad capacitor 46. The voltage on the capacitor 46 is a function of the A.C. current that flows through the diode under test and the impedance offered by that diode at the D.C. operating point as established by the D.C. bias current.

The voltage on the capacitor 46 is applied to a resistor 47, of typically 100K ohms, and appears as a voltage on the positive input terminal 50 of the high gain differential amplifier 51. The gain of the differential amplifier 51 is held constant by a constant 1 megohm resistor 52 in the negative feedback circuit of the amplifier. The differential amplifier 51 also has a negative input terminal 53 connected to the slide arm of a variable resistor 54 of typically 10K ohms which is series-connected to a 100K resistor 55. The other side of the variable resistor 54 is grounded. A battery B+ applies +18 volts to the resistors 54 and 55 with the resistor 54 adjusted so that the D.C. voltage on the terminal 52 has a magnitude that is determined by the desired A.C. voltage amplitude across the diode under test. This desired A.C. voltage amplitude will, of course, depend upon the voltage-current characteristic of the device that is to be inserted into the circuit and, again, solely for the purpose of facilitating any understanding of this invention, this desired voltage may be assumed to be equal to 6 millivolts.

The actual A.C. voltage across the diode under test, FIG. 2, as established by its equivalent D.C. magnitude at the input terminal 50, is compared to the reference voltage on the terminal 53. The comparison is effected by the difference amplifier 51, which produces a difference output voltage at the output terminal 56 when the voltage at the terminal 50 differs from the reference voltage at the terminal 53. If the voltage on the terminal 50 is equal to the reference voltage, the differential amplifier 51 will produce a null or zero voltage output on the output terminal 56.

The terminal 56 of the differential amplifier 51 is connected to a suitable readout device which may comprise a digital voltmeter 57, and through normally closed switches 58 and 59 to a junction 60. The switch 59 has a grounded contact 59a to which it may be connected. With the switches 58 and 59 in the illustrated closed position, a difference voltage appearing at the output terminal 56 of the amplifier 51 charges a capacitor 61, of typically 2 microfarads, that has one plate thereof connected to the junction 60. The capacitor 61 charges to a negative voltage when the magnitude of the reference voltage on the terminal 53 exceeds that on the terminal 50, and charges to a positive voltage when the voltage on the terminal 50 exceeds the magnitude of the reference voltage.

The terminal 60 is connected to the insulated gate of a field effect transistor 62, or alternatively, to the grid of a pentode having a high input impedance. A drain resistor 63 connects a battery source B+ of typically +20 volts, to the drain terminal of the transistor 62. The resistor 63 is selected to provide the desired bias to the transistor 62 with the gate terminal at substantially zero volts. For reasons that will be evident subsequently, a variable resistor 64 that is connected between the battery B+ and the source terminal of the transistor 62 may have its slide arm adjusted to initially establish the D.C. current level of the drain terminal of the transistor 62 so that an initial predetermined A.C. voltage of assumed 6 millivolt amplitude appears across the terminals 37 and 38.

The field effect transistor 62 has an inherent high input impedance and, by reason of its connection to the capacitor 61, provides a relatively high time constant sufficient to ensure that the capacitor 61 will provide a constant bias voltage on the gate of the transistor 62 during the period in the testing cycle when the capacitor 61 is disconnected from the amplifier 51 by the opening of the switch 58. An increase or decrease in the voltage across the capacitor 61 biases the transistor 62 to conduct less or more current. As the transistor 62 is rendered more conductive or less conductive by a decrease or increase in the voltage on the gate of the transistor, the drain level of transistor 62 respectively increases or decreases proportionately causing the level of the D.C. control current applied to the D.C. control terminal 32 of the amplifier 29 to increase or decrease proportionately. The gain of the amplifier 29 thereupon increases or decreases proportionately.

Since an increase or decrease in the gain of the amplifier 29 causes only an increase or decrease in the amplitude of the A.C. component 35, the amplitude of the A.C. component 35 increases or decreases until the A.C. voltage across the diode under test attains the desired amplitude as determined by the D.C. reference voltage on the terminal 53. The desired 6 millivolt amplitude of the A.C. voltage across the diode under test is designated as $\Delta V_1$ in FIG. 1. The A.C. current component through the diode under test which is adjusted through the closed feedback loop to obtain the voltage $\Delta V_1$, is designated $\Delta I_1$. Thus, after the circuit stabilizes, the desired values of $\Delta I_1$ and $\Delta V_1$ are established. Since $$\Delta Z = \frac{\Delta V_1}{\Delta I_1}$$

the dynamic impedance at point 11 is also established.

In order to condition the circuit of this invention for measuring the voltage-current characteristics of a particular code or type of device that is includable within the aforedescribed family of devices, the switch 59 is moved to engage its grounded contact 59a, thereby grounding the capacitor 61 and the base of the transistor 62. The resistor 64 may be adjusted until the drain current of the transistor 62 reaches a level such that the desired A.C. voltage $\Delta V_1$ appears across the terminals 37 and 38. A standard A.C. voltmeter (not shown) may be employed to measure the A.C. voltage across the terminals 37 and 38. To establish this desired A.C. voltage across the terminals 37 and 38 any device having substantially the same value of impedance as that of the devices that are to be tested subsequently may be connected between the terminals 37 and 38.

The variable resistor 54 is now adjusted until a null or zero voltage is produced by the differential amplifier 51. This null condition may be read out by the digital voltmeter 57. With a null on the output terminal 56, the D.C. voltage on the input terminal 53 is the D.C. equivalent of the desired A.C. voltage $\Delta V_1$. The switch 59 may now be restored to its illustrated closed position and the circuit is now conditioned for receiving and testing all devices of the same code or type.

After a diode is inserted into the circuit and the system stabilizes, the ratio of $\Delta V_1 : \Delta I_1$ is established, as discussed above, and the digital voltmeter 57 will indicate a null voltage condition on the output terminal 56 of the amplifier 51.

The switches 28 and 58 are then operated by a relay 66 which is energized by a suitable source 67 every time a switch 68 is closed. An automatic mechanism (not shown) may be employed to close the switch 68 a predetermined time after an untested diode is connected between the terminals 37 and 38 and after the circuit stabilizes. Such mechanism may also be employed to open the switch 68 after the testing of a device is completed. When the switch 68 is closed, the relay 66 is energized to connect the resistor 27 into the negative feedback loop of the current supply 20 and to disconnect the output terminal 56 of the differential amplifier 51 from the terminal 60.

The opening of the switch 58 serves to disconnect and isolate the capacitor 61 from the output terminal 56 of the differential amplifier 51. Because of the high input impedance that the field effect transistor 62 offers to the capacitor 61, the capacitor 61 maintains a voltage on the terminal 60 and thus on the gate of the field effect transistor 62 which is essentially identical to the bias provided by the capacitor 61 immediately prior to the opening of the switch 58. The drain current of the transistor 62 is accordingly fixed at a level determined by the voltage on the capacitor and holds the adjusted ratio of the A.C. component amplitude to the D.C. component of the current signal 33 at the same ratio as that established immediately prior to the opening of the switch 58.

As discussed hereinabove, the connecting of the resistor 27 into the negative feedback loop of the current supply 20 multiplies the amplitude levels of both the D.C. and A.C. components 34 and 35, respectively, of the current signal 33 by a common factor. The amplitude levels of both components 34 and 35 rise or fall by a common factor that is inversely proportional to the resistance ratio of the resistor 27 to the resistor 26. If the resistance offered by the resistor 27 is five times greater than that offered by the resistor 26, the D.C. component 34 will drop to one-fifth of its initial level. The peak-to-peak amplitude of the adjusted A.C. component 35 will also drop to one-fifth of its immediately previous value as previously adjusted by the closed feedback loop to provide the ideal 6 millivolt A.C. voltage to the diode under test.

The shifted D.C. current component 34 is designated as $I_2$ in FIG. 1, and the shifted A.C. current component 35 is designated $\Delta I_2$. The actual A.C. voltage, designated as $\Delta V_2$ in FIG. 1, that now appears on the diode under test as a result of the flow of A.C. current $\Delta I_2$, FIG. 1, through this diode, also appears as a second D.C. voltage across the capacitor 46 and on the terminal 50. This second D.C. voltage, which is equivalent to the actual A.C. voltage on the diode, is compared by the differential amplified 51 to the initially established reference voltage on the terminal 53.

The differential amplifier 51 detects any difference between the fixed reference voltage at the terminal 53 and the voltage on the terminal 50 that corresponds to the A.C. voltage $\Delta V_2$ that now appears across the diode under test. Since the A.C. current $\Delta I_2$ is held to a constant amplitude by the open feedback loop, the amplitude of the voltage $\Delta V_2$ that appears across the diode is directly proportional to the dynamic impedance $\Delta V_2$ at the operating point 12 established by the D.C. component $I_2$. If the differential amplifier 51 produces an output, it indicates that the ratio of $\Delta V_1 : \Delta V_2$ is other than unity. The digital voltmeter 57 may be read to ascertain the relative amount of departure of $\Delta V_1 : \Delta V_2$ from unity. The relative amount of this departure indicates the extent to which the voltage-current characteristic of the diode under test deviates from an ideal voltage current characteristic.

Relay 66 may then be deenergized by the reopening of the switch 68. When the relay 66 drops out, the switches 28 and 58 reopen and the tested diode may be removed from the circuit and another untested diode inserted in its place between the terminals 37 and 38 and the aforedescribed testing operation repeated on that diode.

It will be evident that by merely interchanging the resistors 26 and 27, the dynamic impedance of the nonlinear device at the point 12 may be selected and fixed, and the dynamic impedance at the point 11 compared to that at the point 12. Further, the relative distance between the two operating points 11 and 12 on the curve 10, may be held constant while the two points 11 and 12 are shifted to other positions on the curve 10 by either increasing or decreasing the resistance values of the resistors 26 and 27 by a common factor. If it is desired to either increase or decrease the distance between the operating points 11 and 12, the resistance ratio of the resistors 26 and 27 may be correspondingly increased or decreased to provide the two desired D.C. operating points.

The embodiment illustrated by FIG. 3 permits a direct readout of the dynamic impedance ratio as a decimal number, for example. In accordance with this embodiment, the digital voltmeter 57 is now coupled through a voltage-divider to the terminal 69 formed by the common junction of the rectifier 45, the capacitor 46 and the resistor 47.

The voltage divider comprises two series-connected resistors 70 and 71, and the resistor 70 is connected through a resistor 72 to the terminal 69. The resistor 72 normally has a relatively large value of resistance and is primarily included in the voltage-divider circuit to maintain a constant current through the voltage-divider.

A switch 73 selectively connects an input terminal of the digital voltmeter 57 to terminals 74 and 75. The terminal 74 is formed between the resistors 70 and 71 and the terminal 75 is formed between the resistors 70 and 72. The switch 73 and the switches 28 and 58, FIG. 2, are preferably ganged together so that the switch 73 assumes the illustrated position where it contacts the terminal 74 when the relay 66 is in its normal deenergized state. When the relay 66 energizes, the switch 73 is moved to contact the terminal 75 thereby connecting the resistors 70 and 71 across the input terminals of the digital voltmeter 57. Suitable resistance values for the resistors 70 and 71 may be determined from the relationship:

$$\frac{R_{70}+R_{71}}{R_{71}} = \text{the ideal or desired dynamic impedance ratio}$$

Thus, for an assumed ideal impedance ratio of 5:1, the resistors 70 and 71 would have a resistance ratio of 4:1 and suitable values of resistance for these resistors might be 400 ohms and 100 ohms, respectively.

Assuming again that the ideal ratio of $\Delta Z_1 : \Delta Z_2 = 5$, and that the resistor 70 is selected to offer four times the resistance to the constant voltage across the voltage divider as that offered by the resistor 71. With the switch 73 in its illustrated position, the voltmeter 57 may be calibrated so that when 50 microamperes of D.C. current is applied to the diode under test and the voltage on the terminal 74 is therefore one-fifth the magnitude of the voltage on the terminal 75, the voltmeter 57 will readout decimal number 1.000, for example. Conversely, with the switch 73 moved into contact with the terminal 75 by operation of the relay 66, and with 10 microamperes applied to the diode under test, the voltmeter 57 may be calibrated to readout five times 1.000 or 5.000.

Once the voltmeter 57 is properly calibrated to readout directly the established ideal impedance ratio $$\Delta Z_1 : \Delta Z_2 = 5 : 1$$

the relay 66 may be energized to open the aforedescribed feedback loop and to move the switch 73 into contact with the terminal 75. Any deviation in the magnitude of the voltage which now appears on the terminal 69 and across the voltage-divider will be read out directly by the digital voltmeter 57 as a number which represents the actual dynamic impedance ratio of the device under test. The amount by which this number departs from the ideal ratio number 5.000 will determine whether or not the device is acceptable.

Since positive and negative exponential powers are inversely related to one another, that is, $$e^{-x} = \frac{1}{e^x}$$

devices having negative exponentially varying voltage-current characteristics based upon equations wherein the exponent is raised to a negative power may also be tested by the circuit illustrated in FIG. 2 after minor modifications thereof. These modifications involve changing the readout scaling of the digital voltmeter 57 by selectively connecting appropriately valued readout resistors between the output terminal 56 of the amplifier 51 and ground. A voltage-divider arrangement essentially identical to that illustrated in FIG. 3, may for example, be used. Another modification which might be required would involve changing the resistance values of the resistors 26 and 27, in the manner described hereinabove, to provide the desired operating points on the negative exponential curve.

It is believed that the operation of the above-described embodiments of this invention will be apparent from the foregoing description, and it is obvious that various changes and modifications may be made without departing from the spirit and scope of the invention.

What is claimed is:

1. A circuit for determining the ratio of the dynamic impedance at two points in the operating range of a device having an exponentially-varying voltage-current characteristic, the circuit comprising:
    a pair of terminals for effecting an electrical connection with a device inserted into the circuit,
    a current source for supplying a D.C. current and a superimposed A.C. current to said terminals and the component, thereby producing respective D.C. and A.C. voltages across the device, the level of the D.C. current establishing a first point in the operating range of the device,
    means coupled to one of said pair of terminals for producing a first D.C. voltage equivalent to the A.C. voltage across the device,
    means coupled to the A.C. voltage producing means for comparing the level of the first D.C. voltage to a reference D.C. voltage level representing the desired A.C. voltage across the device at the first point, the comparing means providing a difference voltage corresponding to an amplitude difference between the first D.C. voltage and the reference voltage,
    voltage storage means selectively connectable to said comparing means for receiving and storing the difference voltage,
    means coupled between said voltage storage means and said current source and responsive to the voltage stored by said voltage storage means for adjusting the amplitude of the A.C. current output from said current source until the level of said first D.C. voltage adjusts to substantially the level of said reference voltage, means for disconnecting said storage means from said comparing means whereupon the amplitude ratio of the A.C. to the D.C. current from said current source is fixed by said storage means, means for multiplying both the A.C. and D.C. currents from said current source by a predetermined factor so that the level of the D.C. current establishes a second point in the operating range of the device, the superimposed A.C. current thereupon producing a second A.C. voltage across the device, and means responsive to a change in the level of the adjusted first D.C. voltage caused by the second A.C. current, for indicating the dynamic impedance ratio of the device.

2. The circuit as claimed in claim 1 which further comprises:

an oscillator coupled to said current source for supplying an A.C. signal input of constant amplitude and frequency thereto.

3. The circuit as claimed in claim 2, wherein said means for varying the amplitude of the A.C. current output from said current source comprises:

a variable gain amplifier connected to said oscillator for receiving an A.C. current of constant amplitude and frequency, the gain of said amplifier being controlled by the voltage across said voltage storage means, and the amplitude of the A.C. current from said current source being varied by the voltage output of said amplifier.

4. The circuit as claimed in claim 3, wherein said voltage storage means comprises a first capacitor.

5. The circuit as claimed in claim 4 which further includes:

a current control device connected to said variable gain amplifier and controlled by the voltage across said first capacitor for varying the D.C. current level of said variable gain amplifier.

6. The circuit as claimed in claim 5, wherein said comparing means comprises:

a differential amplifier having one input terminal connected to said reference voltage and a second input terminal connected to the A.C. voltage converting means, said first capacitor being selectively connectable to receive the output of said differential amplifier.

7. The circuit as claimed in claim 6, wherein said A.C. voltage converting means comprises:

a rectifier connected to one of said plural terminals for full-wave rectifying the A.C. voltage across the component, and a second capacitor connected to said second input terminal of said differential amplifier for impressing the rectified voltage received from said rectifier on said second input terminal.

8. The circuit as claimed in claim 7, wherein said current source includes a negative feedback loop, and wherein said means for multiplying the A.C. and D.C. currents by a predetermined factor comprises:

an impedance of known value, and apparatus operative to selectively connect said impedance of known value into said feedback loop.

9. The circuit as claimed in claim 8, wherein said means for disconnecting said first capacitor from the output of said difference amplifier is also effected by the operation of said apparatus connecting said impedance of known value into said feedback loop.

10. The circuit as claimed in claim 9, wherein said means responsive to the change in the first D.C. voltage comprises:

a voltmeter connected in the circuit between said second capacitor and said second input terminal of said differential amplifier.

11. A circuit for determining the deviation of an exponential voltage-current characteristic of a nonlinear device from an ideal exponential voltage-current characteristic for the device, the circuit comprising:

plural terminals in the circuit for effecting an electrical connection with the device inserted into the circuit, a constant current source for supplying a first time-varying current and a first steady-state current to said terminals and the device thereby producing a first time-varying voltage and a first steady-state voltage across the device, the steady-state level of the first current supplied by said current source establishing a first point on the characteristic of the device, means coupled to one of said terminals for producing a static voltage component that is equivalent to the first time-varying voltage, means coupled to the static voltage producing means for comparing the level of the static voltage to a reference voltage level that represents the desired amplitude of the first time-varying voltage across the device, the comparing means providing a difference voltage corresponding to an amplitude difference between the first time-varying voltage and the reference voltage, memory means coupled to said current source and selectively connectable to said comparing means for adjusting and holding adjusted the amplitude of the first time-varying signal from said current source in accordance with the difference voltage received from said comparing means, means selectively connectable to said current source for changing both the amplitude of the first time-varying current and level of the first steady-state current by a predetermined factor, means for connecting the last-mentioned means to said current source and for disconnecting said memory means from said comparing means, so that said current source operating under the control of said memory means, supplies a second time-varying current and a second steady-state current to the device, the level of the second steady-state current establishing a second point on the characteristic of the device and the second time-varying current producing a second time-varying voltage across the device, and means for detecting a deviation between the static voltage that is equivalent to the second time-varying voltage across the device and the reference voltage.

No references cited.

RUDOLPH V. ROLINEC, *Primary Examiner.*

E. L. STOLARUN, *Assistant Examiner.*